(12) United States Patent
Gallagher et al.

(10) Patent No.: US 7,997,891 B2
(45) Date of Patent: Aug. 16, 2011

(54) MOLDING PROCESSES AND TOOL THEREFOR

(75) Inventors: Jeffery M. Gallagher, Greenfield, IN (US); Raymond J. Cipra, West Lafayette, IN (US); Thomas H. Siegmund, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 235 days.

(21) Appl. No.: 12/101,697

(22) Filed: Apr. 11, 2008

(65) Prior Publication Data

US 2008/0251975 A1    Oct. 16, 2008

Related U.S. Application Data

(60) Provisional application No. 60/911,487, filed on Apr. 12, 2007.

(51) Int. Cl.
*B29C 51/10* (2006.01)
*B29C 51/36* (2006.01)

(52) U.S. Cl. ............... 425/388; 425/387.1; 264/553; 264/554

(58) Field of Classification Search .................. None
See application file for complete search history.

(56) References Cited

U.S. PATENT DOCUMENTS

| | | | | |
|---|---|---|---|---|
| 4,684,113 A * | 8/1987 | Douglas et al. | ................. | 269/21 |
| 4,770,455 A * | 9/1988 | Collins, Jr. | ..................... | 294/88 |
| 4,936,560 A * | 6/1990 | Barozzi | ........................ | 269/266 |
| 5,151,277 A * | 9/1992 | Bernardon et al. | ........... | 425/112 |
| 5,513,972 A | 5/1996 | Schroeder et al. | | |
| 5,546,784 A * | 8/1996 | Haas et al. | ...................... | 72/413 |
| 5,984,293 A * | 11/1999 | Abrahamson et al. | ........ | 269/266 |
| 6,484,776 B1 * | 11/2002 | Meilunas et al. | ............. | 156/382 |
| 6,702,272 B2 * | 3/2004 | Monvavage | ................... | 269/266 |

* cited by examiner

*Primary Examiner* — Edmund H. Lee
(74) *Attorney, Agent, or Firm* — Hartman & Hartman, P.C.; Gary M. Hartman; Domenica N. S. Hartman

(57) ABSTRACT

A molding process and apparatus suitable for use in molding processes, including rapid prototyping processes and short run production processes. The molding process and apparatus entail the use of a reconfigurable screen tool having a housing defining a manifold cavity and a plurality of substantially parallel pins, each having a head protruding from the housing and a shank protruding into the housing. The heads of the pins define a screen surface through which air is able to flow, for example, through gaps between adjacent heads or through internal passages within the pins. The process further includes axially moving the pins to configure the screen surface, preventing further axial movement of the pins relative to each other, and then drawing a vacuum within the manifold cavity and creating a vacuum at the screen surface.

7 Claims, 5 Drawing Sheets

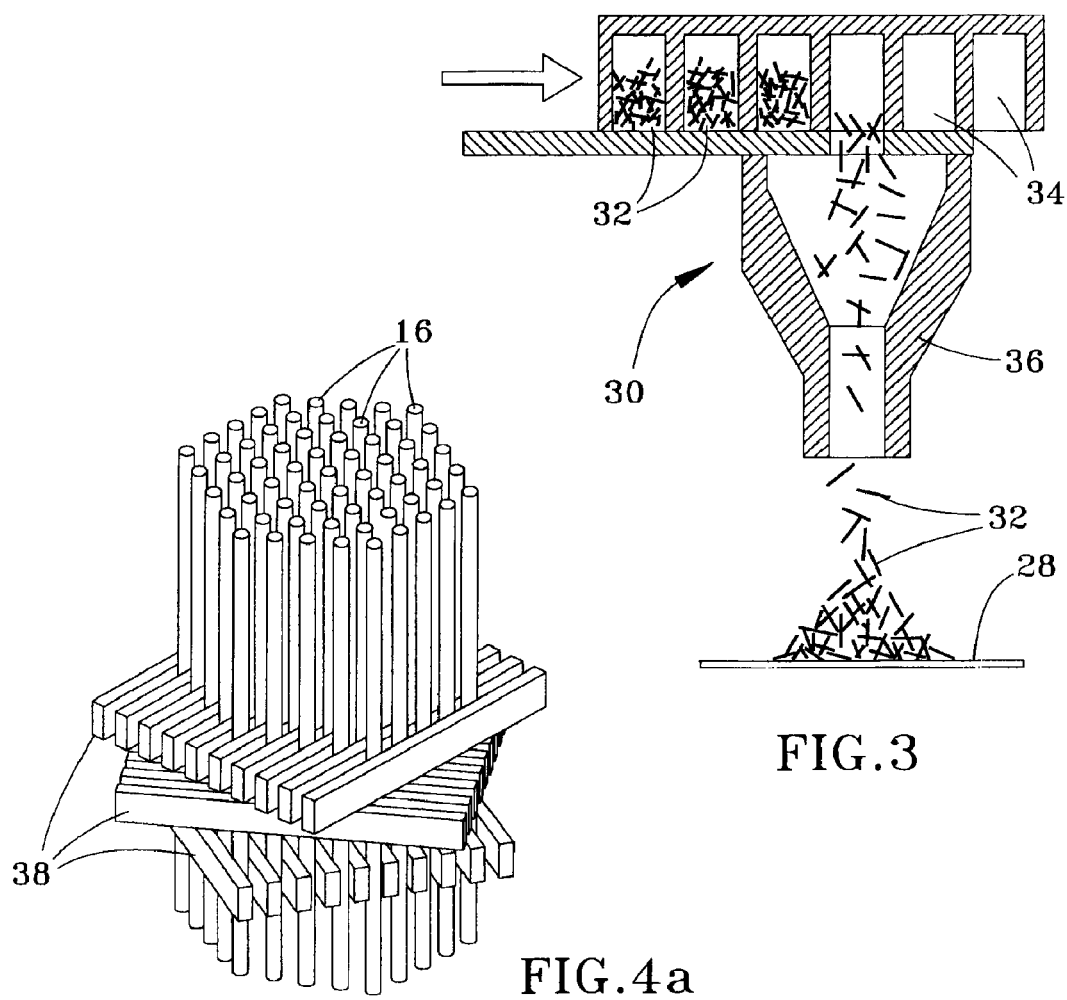
FIG.3
FIG.4a
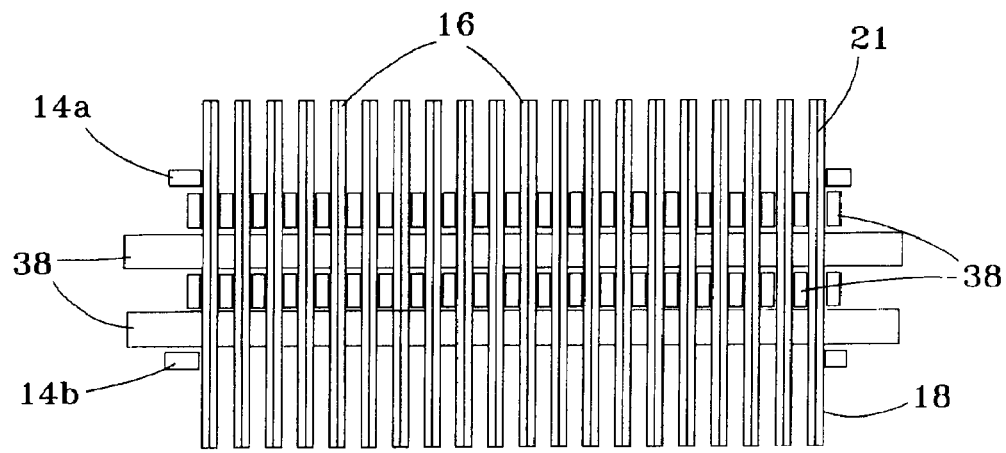
FIG.4b

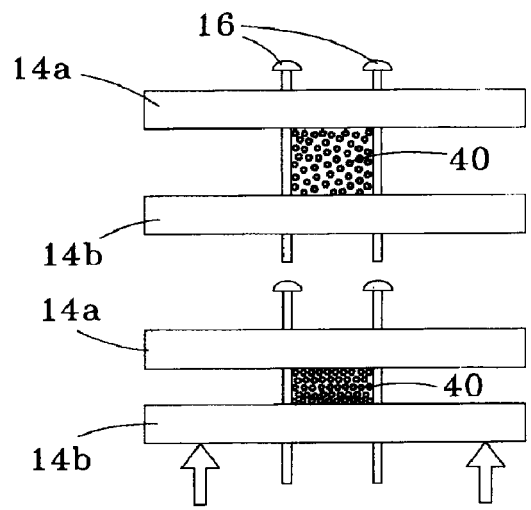
FIG.5a
FIG.5b
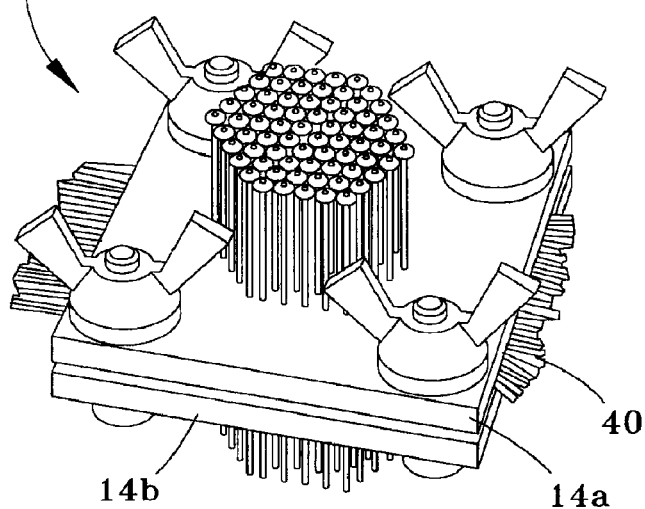
FIG.5c
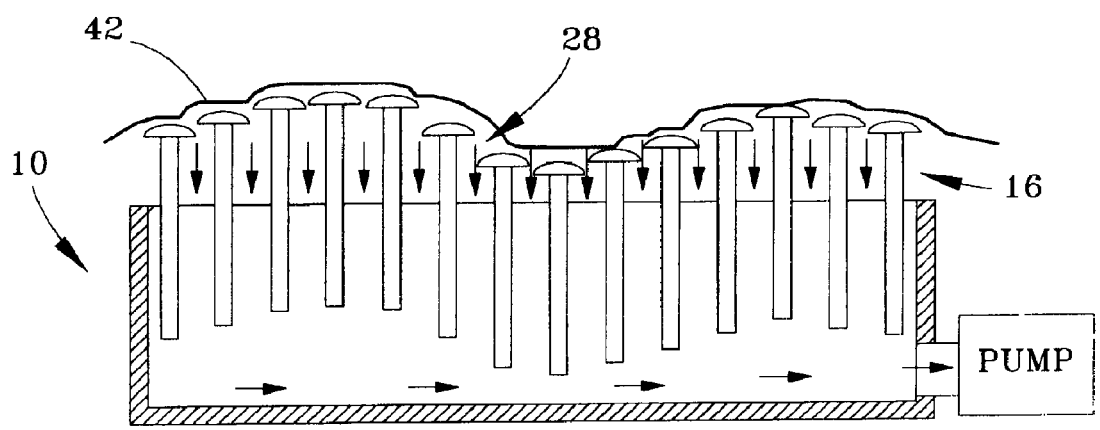
FIG.6

MOLDING PROCESSES AND TOOL THEREFOR

CROSS REFERENCE TO RELATED APPLICATIONS

This application claims the benefit of U.S. Provisional Application No. 60/911,487, filed Apr. 12, 2007, now abandoned, the contents of which are incorporated herein by reference.

BACKGROUND OF THE INVENTION

The present invention generally relates to molding methods and equipment. More particularly, this invention relates to a reconfigurable vacuum screen tool and the use of such a tool in a process, such as rapid prototyping processes and limited production runs capable of producing near-net-shape articles, including fiber preforms and composite parts formed therefrom, as well as forming of materials to produce, for example, molds.

Modern manufacturing and prototype operations have created a demand for manufacturing equipment which can be readily produced and assembled for the purpose of producing prototype and short-run components by various methods. As an example, current computer-aided design (CAD) and computer-aided manufacturing (CAM) technologies (CAD/CAM) employed to develop dies used in forming processes often rely on computer simulations of the particular forming process to reduce the design time and tooling costs for the die, as well as the time necessary to verify the design of the die. The quality of the finished die directly impacts the quality of the article produced. Thus, a rapidly produced die of lesser quality may result in additional time and costs to finish the article, which therefore increases the overall time and cost required to produce a finished article. Consequently, dies that are rapidly designed to be economical for use in prototype and short production runs are often achieved as a tradeoff in die quality and life.

While traditionally directed to the production of metal articles, rapid prototyping also finds use in the production of composite articles, an example being fiber-reinforced structural composites such as carbon-carbon composites. A common method of producing fiber-reinforced composite articles involves producing a preform comprising fibers laid up to have a desired shape and held together with a binder. Such processes are also applicable to various short-fiber composites, including but not limited to carbon-carbon and fiber-glass-reinforced composites. The benefits associated with rapid prototyping of composite articles include the possibility of manufacturing in niche and limited-volume markets. In addition, rapid prototyping during the development of a composite article facilitates the ability to have the article ready for prototype assembly and facilitating production line processing requirements. These advantages are particularly apparent if the composite article can be produced "near-net-shape."

Traditional methods of producing prototype carbon-carbon articles often entail numerous steps. A typical step is a chemical vapor deposition (CVD) process performed on a preform of the desired article. CVD processes used to produce composite articles depend on the basic principles of diffusion, such that the surface area to volume ratio is a critical factor in determining the amount of processing time required to produce the article. If the composite preform can be rapidly produced at near-net-shape, the surface area of the preform exposed to the CVD environment is maximized and the volume of the preform that must be penetrated is reduced. In addition, by reducing the amount of material and energy required by the CVD process, manufacturing costs can also be reduced. Finally, if the preform is generated to near-net-shape, less machining is required after the CVD process.

In view of the above, it is advantageous in the production of composite articles if the article and its preform can be produced using fewer steps and tools. The production of composite preforms typically entail controlled and accurate deposition of a fiber material to form what will become the fiber preform, followed by a resin transfer mold (RTM) process to infiltrate the preform. The mold necessary to produce a three-dimensional preform to near-net-shape is typically expensive to produce and usually dedicated to the production of a single composite article. Accordingly, alternative methods for producing composite preforms have been sought. For example, automated methods have been developed for depositing the fiber material. One such method, known as direct composite manufacturing (DCM), is capable of generating composite parts without the use of a mold. This process is very similar to stereolithography techniques used to produce plastic articles. Another technique involves winding a continuous fiber around a mandrel whose outer surface has the desired shape of the composite article. Yet another technique involves producing preform tapes that are laid-up to generate the desired article. Finally, a technique known as programmable powder preform process (or P4) has been developed. In this process, a large perforated screen is shaped to the desired part dimensions, and a vacuum is pulled through the screen while fibers and binder are sprayed onto the screen surface with a chopper gun. In this way, large parts can be generated relatively quickly. However, a downside to the P4 process is that limited accuracy of the chopper gun prevents finely detailed control of small geometries.

The last three methods discussed above require the use of a mold that is fabricated to be specific to the article being produced. Consequently, it would be desirable if a more versatile mold were available to generate near-net-shape articles. Various tooling has been proposed for use as a rapidly-generated mold, however none appear to achieve the advantages of the P4 vacuum screen tooling. Consequently, a reconfigurable mold capable of use in the P4 process would be desirable for producing a variety of different articles.

Known reconfigurable molds include pin-generated molds that use a matrix of parallel pins aligned so that their adjacent ends approximately generate the desired surface shape of the article to be molded. Each pin must be independently adjustable from its neighboring pins. While a continuous surface can be approximated by the pins, surface details are lost as a result of the step-like different between adjacent pins. As a result, pin-generated molds have been traditionally used in research related to sheet metal forming. The pins are often positioned by turning a lead screw located beneath each pin, requiring the use of a motor associated each pin or a single motor that can be individually engaged and disengaged with each pin. Pin positioning has also been achieved through hydraulic devices. Once the pins have been adjusted to the proper height, they are locked in place. Because the pin-generated surface is not entirely smooth and will produce surface discontinuities in the sheet metal, a thick rubber sheet is often laid over the pin ends to act as an interpolator that helps to better approximate the curvature in the space between the pins.

BRIEF SUMMARY OF THE INVENTION

The present invention provides molding processes and an apparatus suitable for use in molding processes, including rapid prototyping processes and short run production processes.

According to a first aspect of the invention, the molding process entails the use of a reconfigurable screen tool having a housing defining a manifold cavity and a plurality of substantially parallel pins disposed in a wall of the housing so that each pin has a head protruding from the housing and a shank protruding into the housing. The heads of the pins define a screen surface through which air is able to flow, for example, through gaps between adjacent heads or through internal passages within the pins. The process further includes axially moving the pins relative to each other and relative to the wall of the housing to configure the screen surface, preventing further axial movement of the pins relative to each other, and then drawing a vacuum within the manifold cavity and creating a vacuum at the screen surface.

According to a second aspect of the invention, the apparatus includes a reconfigurable screen tool having a housing defining a manifold cavity, and a plurality of pins disposed in a wall of the housing so that each pin has a head protruding from the housing and a shank protruding into the housing. The pins are substantially parallel to each other and axially movable relative to each other and relative to the wall of the housing, and the heads of the pins define a screen surface through which air is able to flow, for example, through gaps between adjacent heads or through internal passages within the pins. The screen tool further has means for axially moving the pins relative to each other to configure the screen surface, means for preventing axial movement of the pins relative to each other, means for drawing a vacuum within the manifold cavity and creating a vacuum at the screen surface, and optionally an interpolator adapted to be placed on the screen surface for defining a surface that is smoother than the screen surface.

According to preferred aspects of the invention, the process can employ the reconfigurable screen tool as a mold to produce fiber preforms, as well as a mold in which the fiber preforms are infiltrated with a resin to form a composite. In the former process, fibers can be deposited on the screen surface and held by vacuum to produce a fiber preform. In the latter process, a pair of the reconfigurable screen tools can be positioned relative to each other so that their screen surfaces face each other to define a mold cavity therebetween, and a fiber preform can be placed within the mold cavity and infiltrate with a resin or other suitable infiltrant injected into the mold cavity. The resulting preforms and composites are suitable for use in near-net-shape applications, notable yet nonlimiting examples of which include structural composites, such as fiber-reinforced composites including carbon-carbon parts.

The screen tool can also be used to fabricate a more conventional mold. For example, a deformable material can be placed on the screen surface prior to drawing the vacuum, and then the vacuum drawn to plastically deform the deformable material. Deformable materials can be processed in this manner to produce, as a nonlimiting example, mold halves that can be assembled to form a mold cavity. As another nonlimiting example, a fiber preform previously produced with a reconfigurable screen tool of this invention can be placed within the mold cavity, and a resin or other suitable infiltrant injected into the mold cavity to infiltrate the preform.

The tools and processes of this invention are believed to be particularly well suited for producing parts of a wide variety of materials, while enabling precise and predictable control of part geometry.

Other objects and advantages of this invention will be better appreciated from the following detailed description.

BRIEF DESCRIPTION OF THE DRAWINGS

FIG. 3 represents a cross-sectional view of a discrete deposition printer head suitable for use with the vacuum screen tool of FIG. 1.

FIGS. 4A and 4B represent perspective and cross-sectional views, respectively, showing two embodiments of a technique for locking pins of the vacuum screen tool of FIG. 1.

FIGS. 5A, 5B and 5C represent perspective and cross-sectional views showing a second technique for locking pins of the vacuum screen tool of FIG. 1.

FIG. 6 represents a cross-sectional view of the vacuum screen tool of FIG. 1 equipped with a filter on which fibers can be deposited and held with a vacuum.

DETAILED DESCRIPTION OF THE INVENTION

FIGS. 1 through 9 illustrate equipment and processing steps suitable for use in rapid prototyping processes and short production runs to produce, for example, fiber-reinforced composite articles. It should be noted that the drawings are drawn for purposes of clarity when viewed in combination with the following description, and therefore are not necessarily to scale.

Figure 1:
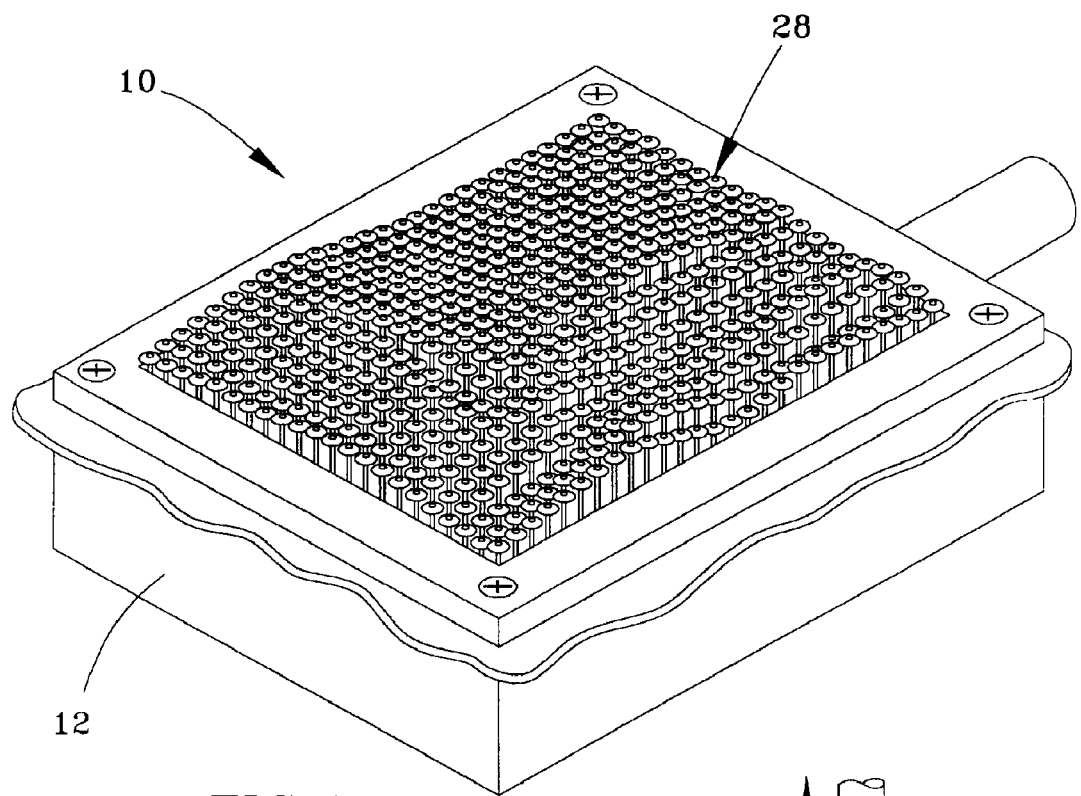
FIG. 1 is a perspective view of a reconfigurable vacuum screen tool for producing a composite preform in accordance with an embodiment of this invention.
Figure 2:
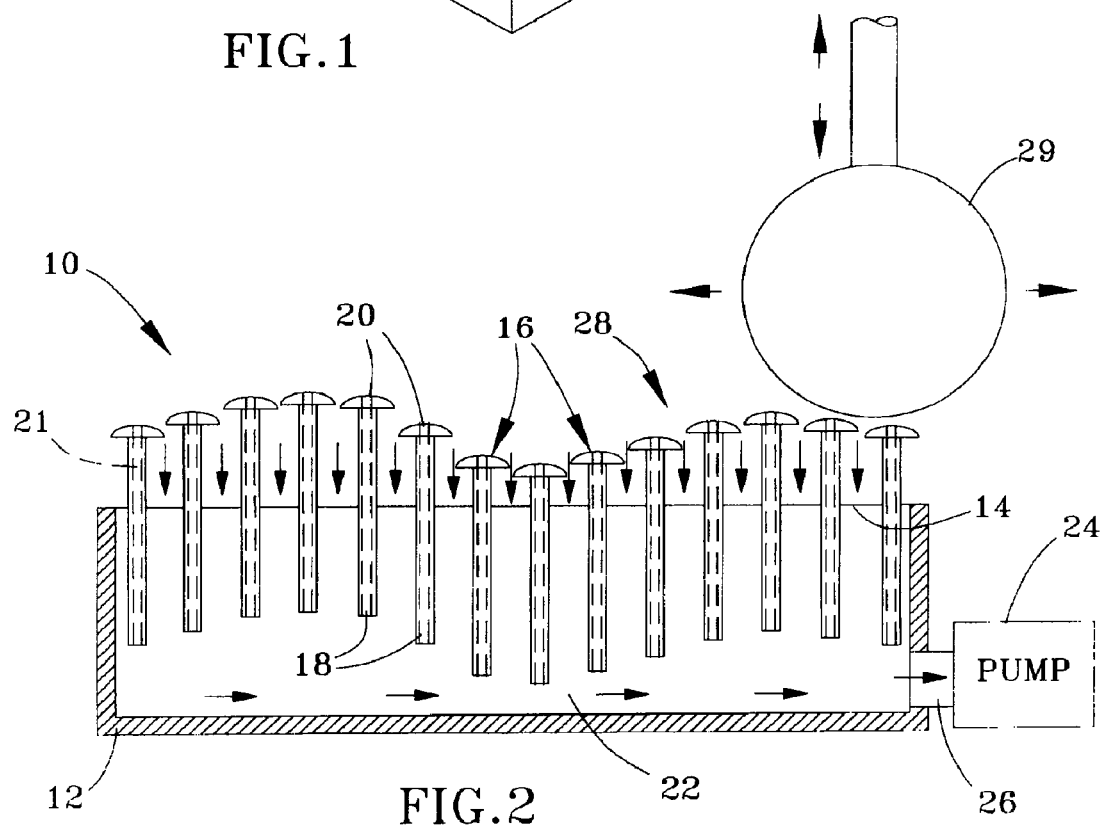
FIG. 2 represents a cross-sectional view of the vacuum screen tool of FIG. 1.
Figure 7:
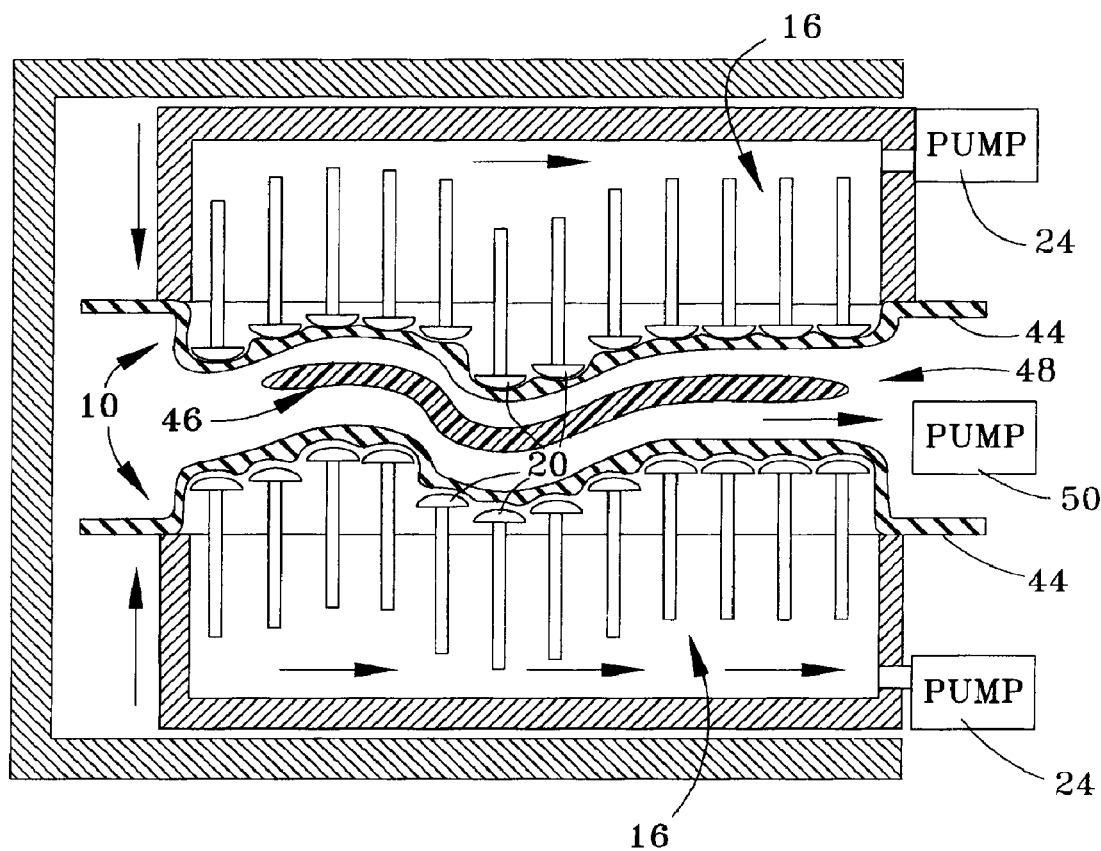
FIG. 7 represents a cross-sectional view of a pair of vacuum screen tools in accordance with FIG. 1, used in combination to form a composite preform.

FIGS. 1 and 2 represent a reconfigurable vacuum screen tool 10 that can be used in place of perforated screens traditionally used in the P4 process (programmable powder preform process) to generate a shape approximating the desired shape and dimensions of an article. In a preferred embodiment of the invention, the tool 10 can be used to form a fiber preform, and then used to infiltrate the preform with a resin. As such, the same vacuum screen tool 10 is preferably utilized more than once during a production process and reconfigured to produce different intermediate and final products of the process. The vacuum screen tool 10 is preferably reconfigurable based on the input of a CAD file through a robotics coupling, yielding a process that is ideal for prototyping new parts that need to be quickly tested and potentially redesigned. According to a preferred aspect of the invention, the tool 10 and the method of its use reduce lead time and eliminate the cost of machining a mold dedicated to producing a single part.

As represented in FIGS. 1 and 2, the vacuum screen tool 10 comprises a housing 12 with a plate 14 configured to align a two-dimensional array of pins 16 that are maintained substantially parallel to each other by the plate 14. The pins 16 are represented as having a shank 18 terminating at a head 20. The pin heads 20 may be expanded and rounded as shown in FIG. 2, or have an external cross-sectional shape that is essentially a continuation of the shank 18 as represented in FIGS. 4A and 4B. Furthermore, some or all of the pins 16 may be formed to have internal passages 21 along their entire lengths, as represented in FIG. 2 as well as FIGS. 4A and 4B, effectively resulting in the pins 16 (or at least their shanks 18) having a tubular shape. Other configurations, including different shank and head cross-sections, are also within the scope of the invention. The interior of the housing 12 defines a manifold 22 through which air (or another gas) can be drawn by a pump 24 through one or more outlet ports 26. The air drawn through the manifold 22 enters the housing 12 through the passages 21 within the pins 16 and/or gaps between the pins 16, as evident from the schematic representation of FIG. 2. The resulting pressure differential generated by the pump 24 within the manifold 22 generates a vacuum at and/or between the heads 20 of the pins 16, which tends to draw and hold objects to the surface 28 generated by the pin heads 20. By adjusting the axial positions of the pins 16 relative to each other, the surface 28 can be contoured to have a variety of shapes. The size and density of the pins 16 determines the resolution of the surface 28, and as such a large pin per surface area count is often desirable. In investigations leading up to this invention, pin densities of 110 and greater than 250 pins per square inch (about 17 and about 40 pins/cm$^2$, respectively) have been successfully used, and is much higher than typical examples of pin-generated molds conventionally used in sheet metal forming. Notably, the tubular pins 16 with passages 21, preferably in combination with shims 38 shown in FIGS. 4A and 4B, have the advantage of increased pin density, thus increasing the resolution of the screen surface 28 generated by the pin heads 20.

According to a preferred aspect of the invention, the vacuum screen tool 10 is intended as a dual-function device that can be rapidly reconfigured to allow the tool 10 to hold fiber tow in place during the generation of a fiber preform, and then serve as a mold surface used to produce a resin-infiltrated preform from the fiber preform. The vacuum is preferably capable of holding fibers to the tool surface 28 to generate a thin-walled fiber preform, even on steep contours of the surface 28. A vacuum generated at the pins 16 can also be used to hold a pliable sheet against the surface 28 to enable the combination of the sheet and surface 28 to be used as a mold on which a composite article containing the fiber preform can be molded. Alternatively or in addition, a pliable sheet can be plastically deformed to produce a mold having a surface contour corresponding to a fiber preform produced on the surface 28. The mold can then be subsequently used as a resin transfer mold to produce a composite article with the preform.

For generating a fiber preform, fibers of the desired material and having the desired dimensions are preferably deposited on the tool surface 28 in a precise and predictable manner such that the final geometry of the desired composite article can accurately be specified to achieve a near-net-shape. A preferred device for this purpose is a robotically-controlled discrete-deposition print head 30 of a type represented in FIG. 3. Similar to an ink jet printer that deposits small drops of ink to produce a continuous image, the print head 30 is adapted to rapidly drop small discrete bundles of fiber 32 in specific locations on the surface 28 of the vacuum screen tool 10. The print head 30 is represented as having multiple compartments 34, each containing a quantity (packet) of fibers 32. The fibers 32 in each compartment 34 may be identical to fibers 32 within other compartments 34, or may differ in material, fiber diameter, fiber length, etc. Each compartment 34 is sequentially aligned with a discharge nozzle 36 through which its quantify of fibers 32 is selectively deposited on the tool surface 28. By robotically controlling the position of the nozzle 36 above the tool surface 28, an appropriate fiber amount and fiber coverage can be achieved on the tool surface 28 to produce a desired fiber preform. Simultaneously with or following the deposition of the fibers 32 or each individual layer of fibers 32 (as the case may be), a light binder is preferably deposited on the fibers 32 to enable handling of the resulting fiber preform. As known in the art, the binder should be chosen on the basis of chemical compatibility with the composite materials and/or capability of cleanly burning off without leaving a harmful residue.

The accuracy and capability of the print head 30 depend on how well fiber deposition can be predicted. In order to understand the distribution of fibers 32 deposited in packets, tests were conducted to model the discrete deposition of fibers 32. Repeated tests revealed that the fiber distribution resulting from a discrete deposition was distinctly similar to a Gaussian distribution. Furthermore, additional tests evidenced that a computer simulation based on Gaussian distribution was able to estimate the fiber coverage resulting from multiple controlled and discrete depositions of fibers. As such, it was concluded that, in combination with the vacuum screen tool 10 of FIGS. 1 and 2, fibers 32 could be discretely and sequentially deposited with the print head 30 of FIG. 3 to generate an actual composite part.

Depending on its exact configuration, the tool surface 28 of the vacuum screen tool 10 can be configured with an existing form or model having the shape of the desired composite article to transfer or imprint the desired shape to the surface 28 in a single operation. Alternatively, the surface 28 can be progressively generated from a CAD file describing the composite article. In the latter case, it would be desirable to rapidly actuate the pins 16 in order to quickly reconfigure the tool surface 28. Because of the preferred high pin density, it may be difficult or expensive to provide a separate actuator for each pin. Therefore, the pins 16 are preferably manipulated in bulk with a robotic-controlled end effector capable of three-axis movement. With this approach, a suitable robotic actuator (not shown) can bring a simple dome-shaped end effector 29 (FIG. 2) into simultaneous contact with multiple pin heads 20 to sculpt the pins 16 by forcing the appropriate pins 16 downward (into the housing 12) a predefined distance specified by the CAD program. While shown above the housing 12, it should be understood that the end effector 29 could alternatively be disposed within the housing 12. If a feature of the desired contour is commonly repeated, a specially designed end effector can be repeatedly used to quickly imprint its shape where needed. The low forces involved in this sculpting process makes it possible for the end effector 29 and its robot to be small and lightweight.

Figure 9:
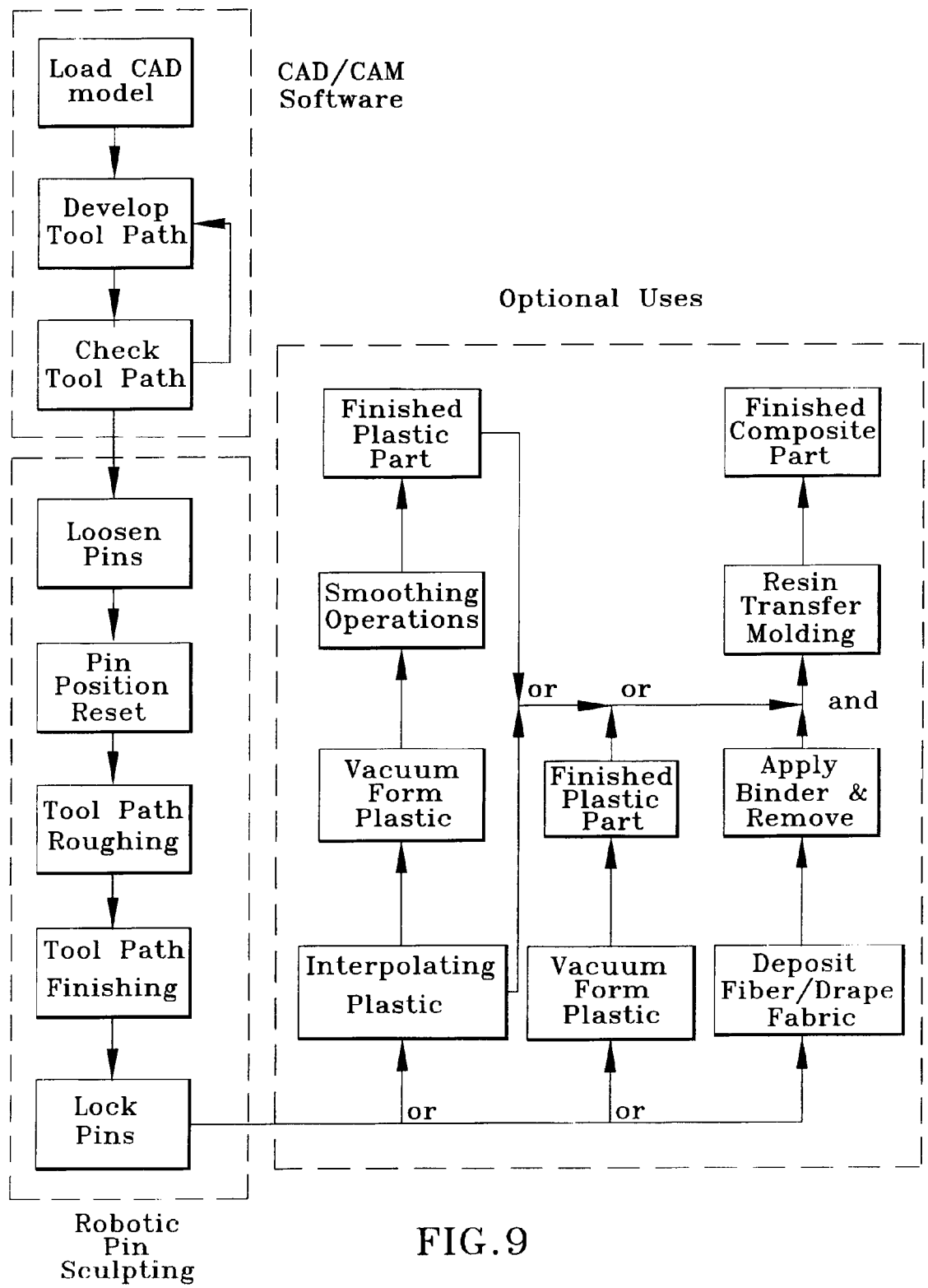
FIG. 9 represents a process flow for robotic shaping of vacuum screen tools of the types represented in FIGS. 1 through 8.

Robotic shaping is a particularly desirable feature for obtaining near-net-shaped articles with the tool 10. An example of a process flow for robotic shaping of the tool 10 is represented in FIG. 9. To enable a CAM approach, software is employed to rapidly shape the tool surface 28 without damaging the pins 16. Such software is preferably capable of analyzing a proposed tool path to determine if it is suitable for sculpting the pins 16, and making changes to the tool path if need be. Tool paths for the end effector 29 (or other suitable tool) can be obtained from commercially-available CNC software programs capable of performing plunging (axial movement) and contouring (transverse movement) operations. Suitable end effectors used to generate desired surface shapes are known in the art, and can vary between those particularly suitable for rough and fine shaping. Different end effectors can be employed on a given plunging path to achieve initial coarse shaping, while a contouring path with the same or different end effector can be employed to perform a final shaping operation. The shape of an end effector is particularly relevant for the contouring-based operation, since in this step a tangential motion between the end effector and pin heads 20 occurs. For a given tool path, the pressure angle between the robotic end effector 29 and any pin 16 is preferably calculated. If a critical angle criterion is violated, the path of the end effector 29 is modified by either selecting a new overall path or by locally modifying the present overall path. Specialized CAM software known and commercially available also allows one to graphically evaluate different tool paths. For example, by comparing possible tools paths, critical angle locations can be identified and avoided.

Once the desired contour has been transferred to the tool surface 28, the pins 16 are preferably locked in position prior to using the tool 10. Various techniques could be used, those represented in FIGS. 4A and 4B and FIGS. 5A through 5C. In FIGS. 4A and 4B, elongate shims 38 are inserted between adjacent rows of the pins 16. As shown, the shims 38 are preferably arranged in tiers, with the shims 38 within each tier transverse to the shims 38 of each adjacent tier of shims, such that the shims 38 within each tier surround each pin 16 on four sides. In FIG. 4A, three sets of shims 38 are oriented about sixty degrees from each other, while FIG. 4B shows two sets of shims 38 oriented ninety degrees apart. The pins 16 of FIG. 4B are further shown as being disposed within an opening in each of two optional plates 14A and 14B (instead of the single plate 14 of FIG. 2). Other configurations are also within the scope of the invention. To lock the pins 16, the shims 38 are pressed laterally together, causing the shims 38 to engage and apply a transverse load to the shanks 18 of the pins 16. The relative force applied to the shims 38 can be readily adjusted to release the pins 16, lock the pins 16 firmly in place, or allow the pins 16 to be moved axially if a sufficient force is axially applied to the pins 16.

In FIGS. 5A through 5C, the pins 16 are disposed in a pair of plates 14A and 14B, and elongate strands 40 (for example, copper wire) are threaded through the pins 16 between the plates 14A and 14B so that the strands 40 surround each pin 16 on four sides. The plates 14A and 14B are then pressed together as indicated by the arrows in FIG. 5B, causing individual strands of the strand material 40 to reorder themselves and apply a transverse load to the shanks 18 of the pins 16, locking the pins 16 in place. As before, the relative force applied to the strands 40 can be readily adjusted to release the pins 16, lock the pins 16 firmly in place, or allow the pins 16 to be moved axially if a sufficient force is axially applied to the pins 16.

Other alternatives to the shims 38 and strands 40 include woven wire tubes whose locking effect is enhanced by deformation of the tubes when compressed, and bars or cams that are rotated to engage the pins 16.

Prior to depositing fibers 32 on the tool surface 28 generated by the pins 16, an air-permeable material 42 (FIG. 6) can be placed over the surface 28 to prevent the fibers 32 and binder from clogging the passages 21 within the pins 16 and/or the gaps between the heads 20 of the pins 16. Several materials have been evaluated with varying success, examples of which include paper filters, carbon veils, and carbon fabrics. Paper filters readily conform to the contours of the tool surface 28, but should be removed from the fiber preform before infiltration with resin to form a fiber preform. Carbon veils composed of long fibers bound together in a random orientation performed well due to their porosity, but were rather stiff and followed sharp contours only with some difficulty. Carbon fabrics were found to have a pliability between the paper fabric and carbon veils, but are less porous than either of these other materials. An advantage of using a veil or fabric material as the air-permeable material 42 is the option of allowing the material 42 to be incorporated as a reinforcement material into the article being formed.

Once the permeable material 42 is in place and while a vacuum is drawn at the tool surface 28, the fibers 32 and binder are deposited and held by the vacuum to the filter surface (if present), thereby effectively conforming to the contours generated by the pin heads 20 at the tool surface 28. Following deposition of the desired amount of fibers 32 and binder, the resulting fiber preform can be lightly compacted to ensure its strength prior to be handled. The vacuum used to hold the fibers 32 to the tool surface 28 can be employed to compact the fibers 32 by placing a rubber sheet over the fiber preform and allowing atmospheric pressure to press and compact the fibers 32 against the pins 16. The preform can then be lifted from the screen tool 10 while remaining intact.

Once the preform is removed from the vacuum screen tool 10, the tool 10 can be used as a molding surface for producing a composite article with the preform. At this point, several options are available as to how the tool surface 28 can be used. According to one option represented in FIG. 7, two vacuum screen tools 10 can be used. A vacuum is drawn on each tool 10 to pull a separate pliable and preferably impermeable (e.g., rubber) film 44 onto the pin heads 20 of each tool 10 to form a mold cavity 48, into which the preform 46 is placed and a resin injected and cured in accordance with known resin transfer molding (RTM) processes. The pliable films 44 provide the additional benefit of acting to interpolate the pin heads 20 and thereby provide a smoother molding surface within the cavity 48. A pump 50 is shown as drawing a vacuum within the cavity 48 to promote the flow of resin and infiltration of the preform 46. Once the preform 46 has been tightly sandwiched between the two vacuum screen tools 10 and the tools 10 have been constrained (as shown), the pumps 24 can be employed to force air into the tools 10 in order to apply pressure to the infiltrated preform 46 during resin cure.

According to another option represented in FIG. 8, the screen tool 10 can be used to produce a traditional mold in which the preform 46 can be placed and resin subsequently injected and cured. With this approach, sheets 52 of plastic (e.g., polystyrene) can be plastically deformed individually on the tool surface 28 by drawing a sufficiently high vacuum with the pump 24 while the plastic sheets 52 are in a sufficiently pliable state. Once cooled, cured, or other measures are taken to ensure their strength and rigidity, a pair of the sheets 42 can be assembled to form a mold cavity (not shown) between which the preform 46 (not shown in FIG. 7) can be placed, and thereafter a resin can be introduced. The mold assembly can then be placed within a vacuum bag (not shown) and evacuated, after which the resin-infiltrated preform is allowed to cure.

Figure 8:
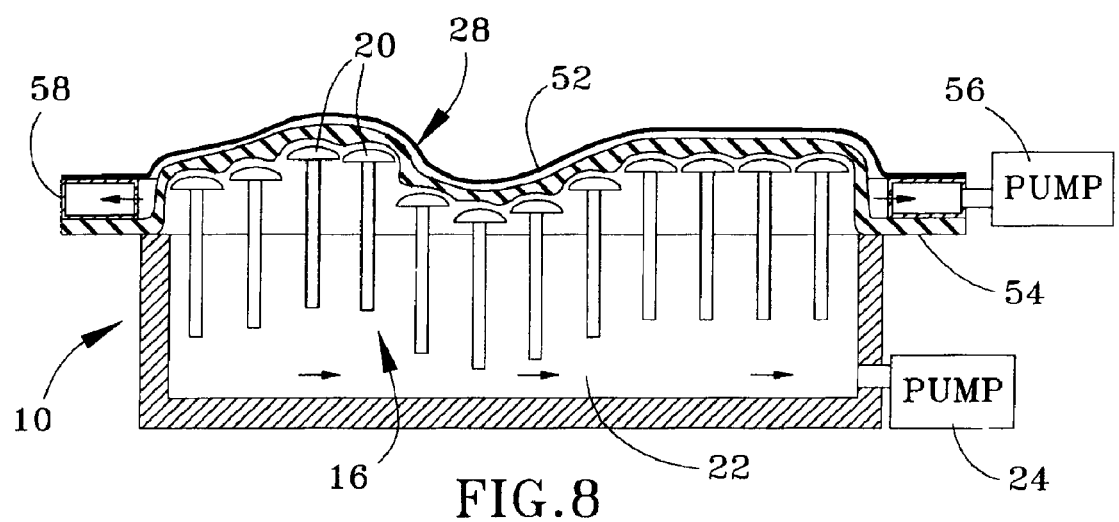
FIG. 8 represents a cross-sectional view of the vacuum screen tool of FIG. 1 configured to form a mold half for subsequent use in the production of a composite article using the composite preform produced in the step shown in FIG. 7.

Because the heads 20 of the pins 16 will form dimples or other discontinuous features in the plastic sheets 52, FIG. 8 shows an optional impermeable pliable film 54 placed over the pins 16 as an interpolating layer. A vacuum is preferably drawn by the pump 24 to pull the pliable film 54 onto the pins 16, after which a second pump 56 draws a vacuum between the pliable film 54 and the plastic sheet 52 through a frame 58 around the perimeter of the vacuum screen tool 10, causing the plastic sheet 52 to plastically conform to the contoured surface of the pliable film 54. The use of the pliable film 54 has both benefits and limitations. The pliable film 54 eliminates surface discontinuities fairly well, but also reduces other and possibly desirable details in the surface of the infiltrated preform, for example, by rounding otherwise well-defined corners. Without the pliable film 54, the pin heads 20 generate surface discontinuities that are transferred to the infiltrated preform formed in the tool 10. Whether the surface discontinuities are detrimental or not depends on subsequent processing of the infiltrated preform. If the infiltrated preform subsequently undergoes carbonization to produce a carbon-carbon composite, in which all of the resin infiltrated into the preform 46 is charred, surface discontinuities are removed by the charring process, and therefore the pliable film 54 is unnecessary and can be omitted.

Another approach is to eliminate surface continuities through additional processing steps. For example, the process flow represented in FIG. 9 identifies "Smoothing Operations" that may be carried out by, for example, grinding the vacuum-formed plastic sheet 52 after it has cooled, but while still held on the tool surface 28 by vacuum. Smoothing operations of this and other types can be performed by the same robotic actuator employed to manipulate the end effector 29 during sculpting of the pins 16, but with a different type of end effector attachment.

In view of the above, the present invention provides a reconfigurable screen tool 10 that can be employed as a mold to produce a fiber preform 46 as well as resin-infiltrate the fiber preform 46. Resulting preforms are suitable for use in near-net-shape applications, notable examples of which include structural composites such as fiber and fabric-reinforced composites including carbon-carbon composite materials. The near-net-shape resin-infiltrated preforms are well suited for use in rapid prototyping processes as well as small production runs of near-net-shape articles, including those having a high area to volume ratio. The tool 10 and process of this invention are also believed to be particularly well suited for relatively small parts composed of essentially any type of short fiber or fabric reinforcement material, while enabling precise and predictable control of part geometry. The tool 10 and process further allow for faster densification of the composite part and avoid waste otherwise generated by machining excess material from the part.

While the invention has been described in terms of specific embodiments, it is apparent that other forms could be adopted by one skilled in the art. For example, the physical configuration of the screen tool 10 and printer head 30 could differ from that shown, and various materials and processes could be used to produce the components of the screen tool 10 and printer head 30, the fibers 32, and infiltration resin. Therefore, the scope of the invention is to be limited only by the following claims.

The invention claimed is:

1. An apparatus having a reconfigurable screen tool comprising:
    a housing defining a manifold cavity;
    a plurality of pins, each pin having a head protruding from the housing and a shank protruding into the housing, the pins being substantially parallel to each other and axially movable relative to each other and relative to the housing, the heads of the pins defining a screen surface through which air is able to flow;
    means for axially moving the pins relative to each other to configure the screen surface by engaging the heads of the pins to cause axial movement thereof, wherein the axial moving means comprises a robotic-controlled end effector sized to simultaneously contact the heads of a plurality of the pins but not simultaneously contact the heads of all of the pins, and the axial moving means causes the robotic-controlled end effector to simultaneously contact the heads of the plurality of pins to simultaneously sculpt the plurality of pins;
    means other than the axial moving means for preventing axial movement of the pins relative to each other by engaging the shanks of the pins;
    means for drawing a vacuum within the manifold cavity and creating a vacuum at the screen surface; and
    optionally an interpolator adapted to be placed on the screen surface for defining a surface that is smoother than the screen surface.

2. The apparatus according to claim 1, wherein the axial movement preventing means comprises multiple tiers of elongate elements between the shanks of the pins, and means for causing the elongate elements of each tier to apply a traverse load to the shanks.

3. The apparatus according to claim 1, further comprising a discrete deposition print head adapted to locally deposit discrete quantities of fibers on the screen surface.

4. The apparatus according to claim 1, wherein the reconfigurable screen tool is a first of at least two reconfigurable screen tools according to claim 1, the apparatus further comprising means for constraining movement of the at least two reconfigurable screen tools relative to each other when the screen surfaces thereof are facing each other to define a mold cavity therebetween.

5. The apparatus according to claim 4, further comprising means for drawing a vacuum within the mold cavity.

6. The apparatus according to claim 5, wherein the interpolator is placed on the screen surface of each of the reconfigurable screen tools.

7. The apparatus according to claim 1, wherein at least one of the pins has an internal passage open at the head thereof, and the drawings means is further operable to draw a vacuum through the internal passage to create the vacuum at the screen surface.

* * * * *